Figure 1:
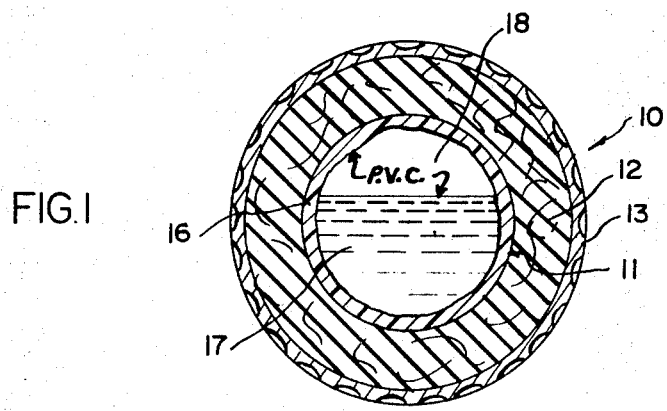

United States Patent

[11] 3,616,101

| [72] | Inventors | Fred E. Satchell;<br>David T. Retford, Cincinnati, Ohio; Robert S. Barnes, Muskegon, Mich. |
|---|---|---|
| [21] | Appl. No. | 880,448 |
| [22] | Filed | Dec. 5, 1969 |
| [23] | | Division of Ser. No. 647,667, June 21, 1967, Pat. No. 3,490,770 |
| [45] | Patented | Oct. 26, 1971 |
| [73] | Assignee | Brunswick Corporation |

[54] BALL OR OTHER ARTICLE OF MANUFACTURE HAVING A LIQUID CENTER
16 Claims, 3 Drawing Figs.

[52] U.S. Cl..................................................... 161/7,
156/146, 156/170, 161/16, 161/168, 161/412, 264/4, 264/22, 264/302, 264/325, 273/231
[51] Int. Cl....................................................... A63b 37/08
[50] Field of Search........................................... 273/231; 156/145, 146, 170, 172; 161/7, 16, 168, 412, DIG. 1; 264/4, 302, 319, 325, DIG. 37; 199/13.4

[56] References Cited
UNITED STATES PATENTS

| 2,229,170 | 1/1941 | Greene......................... | 273/231 |
| 2,278,381 | 3/1942 | Reichard...................... | 156/146 X |
| 3,095,261 | 6/1963 | Meyer........................... | 264/263 |
| 3,293,344 | 12/1966 | Barnes et al. ................. | 264/302 |
| 3,440,714 | 4/1969 | Ryan et al..................... | 264/302 X |

FOREIGN PATENTS

| 1,049,573 | 11/1966 | Great Britain................ | 273/231 |

Primary Examiner—John T. Goolkasian
Assistant Examiner—Henry F. Epstein
Attorney—Hofgren, Wegner, Allen, Stellman & McCord

ABSTRACT: A liquid center for an article and a method for making the same from a liquid reactive mass such as a polyvinyl chloride plastisol by forming the plastisol to spherical shape, e.g., in a mold, and then reacting the outer portion of the mass to form a solidified skin while leaving the inner portion liquid.

PATENTED OCT 26 1971　　　　　　　　　　　　3,616,101

INVENTORS
FRED E. SATCHELL
DAVID T. RETFORD
ROBERT S. BARNES

BY Hofgren, Wegner, Allen, Stellman & McCord.

ATTORNEYS

BALL OR OTHER ARTICLE OF MANUFACTURE HAVING A LIQUID CENTER

This is a division of application Ser. No. 647,667 filed June 21, 1967 now U.S. Pat. No. 3,490,770. This invention relates to plastic articles which include a plastic skin or shell and have a liquid center, and the invention further relates to the manufacture of such articles. In a particular form, the invention relates to such articles as liquid centers for golf balls which can be manufactured by a simplified procedure in accordance herewith.

In the manufacture of various items of commerce, it is necessary or desirable to enclose or encapsulate a liquid in a plastic skin or shell. Such items of commerce include liquid centers for golf balls, pressure rupturable capsules containing a pigmented liquid or ink which may be used in the manufacture of carbonless copy paper, plastic shells containing a freezable or chillable liquid encapsulated therein as an article of commerce which can be used as an ice cube substitute, and like articles. The present invention is directed to such articles of commerce and is especially concerned with the manufacture of liquid centers for golf balls.

In the art of manufacture of golf balls the development of the rubber thread wound center has been considered a major breakthrough in improving the performance of a golf ball. Soon thereafter it was found that a liquid-filled center performed very well and development was directed toward the improvement of the liquid center. Today, the thread wound liquid center golf ball is considered the standard of excellence by the majority of both professional and amateur players.

The manufacture of a liquid center for a golf ball has heretofore usually involved a multioperation procedure. In one method a suitable liquid, such as ethylene glycol is encapsulated within a gelatin capsule to form a liquid filled sphere. This sphere is then frozen, covered with two preformed hemispherical rubber shells and placed in a heated mold and the rubber shells are vulcanized. The resulting rubber covering provides adequate strength for the sphere so the covered sphere can be used as a center of the golf ball. Another method of manufacture involves the precuring of hemispherical rubber shells, the application of a suitable cement to the lips of the rubber shells, immersion of the shells in a liquid, and then mating and bonding the two rubber shells together to form a sphere containing the liquid. Another method of manufacture involves the placing of a liquid filled gelatin pill in precured hemispherical rubber shells and bonding the shells together with adhesive. It has also been suggested to preform a complete hollow sphere and inject the liquid through the sphere wall. However, each of these procedures requires many operational steps as well as a multiplicity of molds, presses, assembly fixtures and/or the like. This makes the liquid center an expensive item to produce and the high cost of manufacture is reflected in the high price paid by the consumer for the liquid center golf balls.

It is a general object of this invention to provide a new and useful article of manufacture of the type having liquid encapsulated in a skin or shell.

Another object of this invention is to provide a new and useful liquid center for a golf ball and to provide a new and useful simplified procedure for manufacture of the same.

Figure 2:
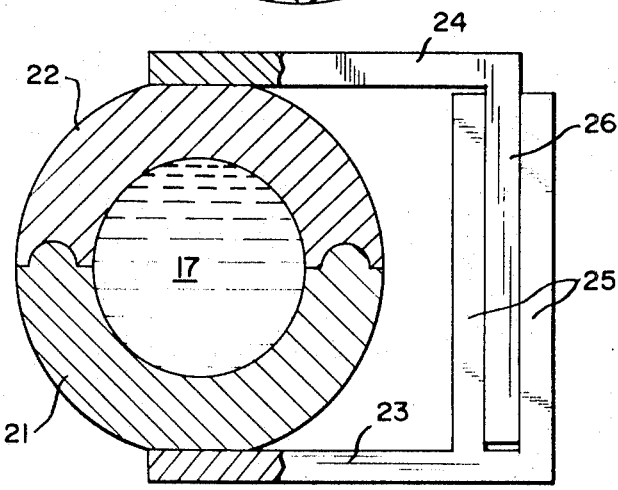
Figure 3:
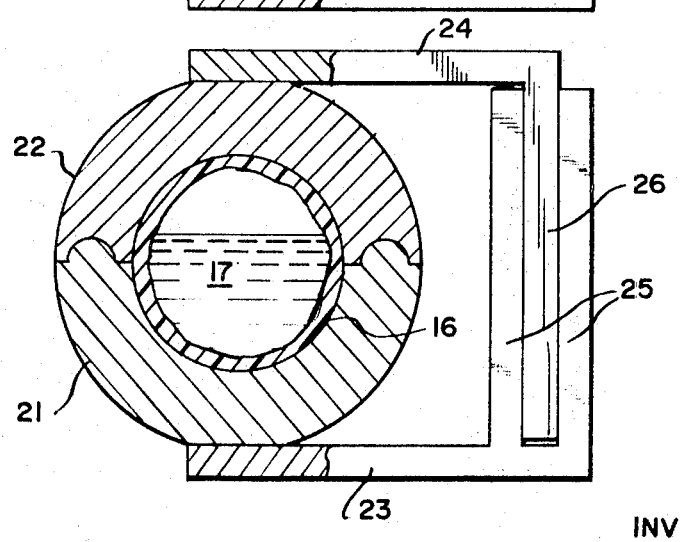

Another general object of this invention is to provide a new and useful method for the manufacture of such articles according to the foregoing objects, which method eliminates much of the procedure and equipment formerly considered necessary for the manufacture of such articles. Other objects of this invention will be apparent from the following description and the drawings in which:

FIG. 1 is a cross section through an embodiment of a golf ball, produced by the method of this invention;

FIG. 2 is a cross section through an assembled mold including liquid ingredients for manufacturing the embodiment of liquid center of the golf ball of FIG. 1; and FIG. 3 is a cross section through the assembled mold of FIG. 2 containing the embodiment of liquid center after it has been formed. While this invention is susceptible of the embodiment in many different forms, there is shown in the drawings and will herein be described in detail an embodiment of the invention with the understanding that the present disclosure is to be considered as an exemplification of the principles of the invention and is not intended to limit the invention to the embodiment illustrated.

The article of manufacture of the present invention has a solid skin enclosing a liquid central portion. The composition of the skin includes a solid molecular structure which is derived from the molecular structure of the liquid portion. The liquid molecular structure is convertible to the set solid molecular structure, e.g., by thermosetting, polycondensation, catalytic conversion, or by other chemical conversion mechanism. Thus, the liquid of the central portion is a precursor of the solid skin.

Turning now to FIG. 1 of the drawings, there is illustrated a golf ball 10 embodying a structure of the present invention in the form of a central core 11. The golf ball 10 also includes a rubber thread winding 12 about central core 11 and an impact and rupture resistant cover 13 enclosing the winding 12. The central core 11 includes a skin portion 16 and a liquid portion 17. Air or other gas may be entrapped or otherwise present within the skin 11 during manufacture of the central core portion 11, as indicated at 18.

Generally, in the manufacture of articles according to this invention, the shape of the article is formed from a mass of liquid which is settable or convertible to a solid portion. Thereafter the outer portion only of the liquid mass is set or converted to form the solid skin enclosing the remaining portion of the liquid. Various procedures for converting settable or convertible liquids to solids are well known in the art and any of these can be used in making articles of the present invention. Most commonly, a thermosetting composition would be used and the setting step would be carried out by heating the mass of liquid from the exterior at a sufficiently high temperature to set only the outer portion of the mass of liquid. Alternatively, for example, polymerizable resin which is polymerizable by contact with a catalyst under certain temperature and/or pressure conditions, e.g. ambient temperature and atmospheric pressure, as prescribed by the supplier of the resin, can be converted to a solid in the manufacture of articles of this invention by contacting only the outer portion of the liquid mass with the catalyst under the prescribed conditions. Similarly, a cross-linkable polymer or prepolymer which is liquid in nature can be set by contacting the outer portion only of the liquid mass with sufficient cross linking agent to form a skin under the prescribed cross-linking conditions. Alternatively, a liquid cross linking agent can be contacted at its outer portion with liquid monomer or solid polymer or prepolymer to cross link the monomer, prepolymer or polymer to cross link the outer portion of the liquid mass and thereby form the solid skin leaving a liquid center composed of cross linking agent. Other conversion systems will be apparent to those in the art from the descriptions contained herein.

As a more particular illustration of the manufacture of an article in accordance herewith and with reference to FIGS. 2 and 3 of the drawings, there is provided a system which a liquid core for a golf ball can be manufactured. The system includes a pair of mating mold halves 21 and 22 of conventional design for molding a golf ball core. The mold halves 21 and 22 are made of a heat transmitting material for transmitting heat applied externally through mold walls to the liquid material 17 within the mold. A mold clamp is also provided having clamp arms 23 and 24 for releasably clamping the mold halves together. It will be noted that each of the mold halves has a flat surface for engaging a clamp arm. One clamp arm 23 includes an upstanding bifurcated portion 25 defining a receiver for receiving a downwardly extending leg 26 from the other arm 24. A suitable bolt and nut or other fastening system can be used to releasably secure leg 26 within bifurcated portion 25 to hold the mold in closed position once the mold halves have been assembled.

In use of the molding system illustrated in FIGS. 2 and 3, the mold clamp and the mold halves are opened and each mold half is filled with an ambient-temperature-stable, convertible liquid material. The material is preferably in the form of a viscous liquid so that the mold halves can be assembled with minimum spilling. The mold halves are then joined along the seam and placed in the clamp which is used to hold them tightly together so as to prevent leakage. Sufficient heat is ten applied to the outside of the assembled mold to convert only the external portion of the liquid 17 to a solid skin 16 (FIG. 3) while retaining a major proportion of the liquid 17 in stable liquid state. In the case of thermosetting compositions, this can be readily accomplished by providing a liquid bath, or other environment, at a temperature well above the temperature required for setting the liquid material or composition within the mold. The mold can then be immersed in the bath for a suitable short period of time sufficient to convert only the outside portion of the liquid. Since the inner portion of the liquid is not heated to a temperature sufficient to convert it, it remains as a stable liquid.

Alternately, and still referring to FIGS. 2 and 3, where liquid conversion techniques are used which employ two reactants which react with each other to form a solid material, e.g., by cross linking, catalyst action on a liquid, polycondensation of two different compounds or the like, one of the reactants can be coated on the inside of the mold halves and the other reactant, in liquid form, can then be placed within the coated mold halves and then the mold is assembled. The mold is then retained under conditions, e.g., for a time and/or at a temperature sufficient to cause the reaction of the two reactants at the exterior portion of the liquid mass to form the solid skin 16. The mold is then disassembled as above and the finished article is removed.

In the manufacture of a golf ball employing a liquid core produced according to the foregoing, the liquid in the core is usually of a freezable composition, i.e., freezable at a reasonable temperature level such as about 50°F. The core removed from the mold is frozen to solidify the liquid and rubber thread or other elastic thread is then tightly wound about the core. Freezing the core prevents deformation of the core during winding. After winding, the wound core is then placed and centered in a cover mold and a cover of a material normally used for golf ball covers is molded around the wound core. The winding of the central core and the covering of the wound core are by conventional procedures known to those in the art and do not along constitute the present invention. However, in the preferred form of the invention, in the production of a golf ball, these procedures, when used in combination with other procedures described herein, are intended to be within the scope and spirit of and of the invention.

As a more specific example of the manufacture of a liquid center for a golf ball according to the procedure of the present invention, a vinyl plastisol was prepared having the following composition:

| Material | Parts Weight |
| --- | --- |
| Bakelite QYNV | 60 |
| Pliovic M-70 | 30 |
| Paraplex G-33 | 30 |
| Diisodecyl Phthalate | 15 |
| Sartomer SR 7 | 10 |
| Vanstay RZ 25 | 2 |
| Stan-Tone 10 PCO1 | 1 |

Bakelite QYNV is a polyvinyl chloride obtainable from Union Carbide Chemical Corporation and Pliovic M-17 is a polyvinyl chloride containing about 95 percent of its molecular units derived from vinyl chloride and obtainable from Goodyear Chemical Company. Paraplex G-33 is a polyester marketed by Rohm and Haas Company as a plasticizer for use in a polyvinyl chloride plastisol. Sartomer Resin SR 7 is a high-boiling low-viscosity liquid resin that has been designed specifically as a pound-for-pound replacement for vinyl resins and plastisols (other vinyl resins) and is believed to be predominantly triethylene glycol dimethacrylate. Vanstay RZ 25 is a barium-cadmium-zinc compound in organic solvent used as a heat stabilizer for plastisols, available from R. T. Vanderbilt Company, and Stan-Tone 10 PC01 is a colored pigment dispersed in diallyl phthalate or other suitable plasticizer and available from Harwick Standard Chemical Company.

In this specific example, an aluminum mold, as illustrated in FIGS. 2 and 3, was used. The mold was designed with generally uniform mold wall thickness overall. An insulated metal beaker was used to hold a molten mass of lead as the heating medium for setting the composition. The beaker was large enough to accommodate the mold and mold clamp together in addition to the molten lead. The mold was prepared by coating the inner cavity with a silicone mold release agent. The two mold halves were then filled with the plastisol specifically identified above and the mold halves were mated in such a manner to avoid any air being entrapped. The halves were then clamped tightly together. The molten lead bath was preheated to a temperature of about 380° to 385°C. and the clamped mold was plunged into the molten lead bath for 15 seconds total immersion time. The mold was removed and immediately plunged into and held in cold water for 1 to 2 minutes. The mold was removed from the water, unclamped, and the resulting molded golf ball liquid center was removed. The center weighed about 0.5 ounces and had a solid wall thickness of about 0.15 inches and an outer diameter of 1.075 inches.

A golf ball center made according to the above specific example was then used in the manufacture of a golf ball. Accordingly, the center was placed in dry ice until it was frozen solid and it was then wound to a 1.620 inch size with natural rubber thread. The thread was rectangular in shape measuring 0.0625 inches by 0.018 inches and an elongation of 700 percent was used during winding. The wound core was covered with a balata compound as a cover material and the cover was then vulcanized, cleaned, and painted with a white urethane coating in a conventional manner.

Six balls made according to the foregoing specific example were tested and found to have the following average properties:

| | |
| --- | --- |
| Diameter | 1.675 inches |
| Weight | 1.570 ounces |
| Compression (1) | 85 |
| Percent rebound from a 72 inch drop | 70% |
| Initial velocity (2) | 250 F.P.S. |

(1) Tested on an Atti Engineering Corporation golf ball compression tested by conventional test procedure.
(2) The ball velocity during the first 10 feet of flight as tested on a U.S.G.A. design velocity test machine.

All six balls were found to perform very well in play and had the same good sound, feel, and playability as other large liquid center balls. All but the test data conformed to the United States Golf Association requirements for a tournament approved ball.

The present manufacturing process uses a liquid form of a material which contacts the inner surface of a mold and is converted to a solid form while the liquid material located in the central portion remains in a stable liquid state. This results in the formation of a body having a tough skin and a liquid center which then can be put to use, for example as a golf ball center.

The liquid center is a stable liquid in that it remains a liquid over a reasonable period of use of the article, e.g., at least about one or two years in the case of a golf ball.

As further specific examples of the manufacture of articles according to this invention, any combination of finely divided vinyl dispersed as a plastisol in a liquid plasticizer, which converts to a solid under application of heat and/or other changes from ambient or normal conditions, may be used, Plasticizers for forming plastisols are well known and widely used in many arts. We have found that the solid wall thickness of the article can be controlled by controlling the conversion or reaction conditions, e.g., the bath temperature and/or emersion time when using thermosetting compositions. For example, in additional runs according to the foregoing specific example, it has been found that 75 seconds in a molten lead bath at 280°C. or 10 seconds in a molten lead bath at 400°C. produce centers similar to those made under the above conditions of 15 seconds at 380 to 385°C. The lower temperature results in a somewhat weaker skin while the higher temperature causes some tearing of the vinyl skin, although both were acceptable. The time and temperature relation will be varied, of course, as the plastisol composition is changed. Optimum conditions can readily be established by simple experimentation.

As another specific example, the mold of FIGS. 2 and 3 was again used and a nonflowing paste was prepared by mixing MEK peroxide with sufficient talc. The resulting paste was used to coat the inside of the spherical mold halves with a layer approximately three thirty-second inch thick. A polyester resin mix was prepared consisting of 97 parts by weight Cyanamid Laminac Resin 4152 believed to be about 70 parts by weight of a rigid nonpromoted low-viscosity polyester resin dissolved in about 30 parts by weight styrene) and 3 parts by weight cobalt napthenate solution. This resin mix was then poured into the mold halves over the applied paste to fill the mold halves and the mold was closed and clamped as above. After 16 hours at room temperature the mold was opened and a solid skin liquid filled sphere was removed.

As still another specific example, a paste was made by mixing Cab-o-sil (a silica powder) with a urethane curative available from E. I. du Pont de Nemours and Company, Inc. under the trade name Caytur. Caytur consists of approximately 85 percent by weight cumene diamine and 42 percent by weight m-phenylene diamine. The paste was used to coat the inside of the spherical mold to a layer approximately three thirty-second inch thick. The coated mold was then filled with Adiprene L-100 (an isocynate terminated liquid urethane rubber having a specific gravity of 1.06 ±0.03 at 25/4 degrees centigrade and also available from duPont). The mold was closed as before and clamped and heated at 285°F. for 120 minutes. The mold was then cooled go room temperature and opened. A solid skin liquid filled sphere was obtained from the mold.

As yet another example, a dispersion of rubber in water is prepared and poured into the mold halves after having coated the mold halves with a coagulant. The dispersion of rubber is a natural rubber latex, such as Creamed Latex, Hevea, having a 60 to 68 percent solids content in water and available from H. Muchlstein & Co., Inc. The coagulant is coagulant # supplied by General Latex & Chemical Corp. and consists of a 30 percent solids solution of calcium nitrate in an alcoholic vehicle. For coating the mold, a paste is prepared from the coagulant using talc. The coagulant paste is applied to the mold interior surface and lip and is permitted to dry thoroughly. The latex is then poured into the mold and the mold halves are clamped together. The clamped mold is immersed in hot water at 180°F. for a 5-10 minute period. The mold is then cooled to room temperature and the resulting solid skin liquid center sphere is removed.

In yet a further example, a paste is prepared by mixing triethylene tetramine with a suitable filler and the resulting paste is applied to the interior of the mold. A liquid epoxy resin is added to the mold and the mold is closed, clamped and dipped in a molten lead bath maintained at an elevated temperature of about 400°F. for a few minutes sufficient to set the epoxy resin amine mixture at the inner surface of the mold. The mold is then cooled by immersing in cold water and is opened to recover a spherical article having a hard solid skin and a liquid center.

As indicated above, any convertible liquid can be used in accordance herewith and any conversion technique for converting that liquid can be used under the proper conversion conditions to produce articles of this invention. Although we have given both specific and general examples of the present invention, it is to be understood that much latitude can be left to the practitioner of the invention in the selection of the materials to be used and the conversion system to be used. The materials and systems are well known in the text books and patent art and information can be obtained relating to suitable materials and systems from suppliers of materials. The selection of the material and system is not critical. However, certain physical properties are desirable in the preferred form of the invention where liquid centers for golf balls are produced. For such use, it is preferred that the liquid have a freezing point above about -50°F. so that it can be readily frozen for winding a tight rubber strand and covering the golf ball. For such application, it is also preferred that the skin portion be of a solid flexible elastic plastic material having sufficient resilience to maintain its own form.

Other systems which can be used in converting involve the emulsion, bulk and/or solution polymerization of liquid monomers or liquid prepolymers, such as those of ethylene, vinyl chloride, acrylonitrile, vinyl acetate, styrene, butadiene, isobutylene, methylmethacrylate, vinylidene chloride, chloroprene, tetrafloroethylene, triflorochlorethylene and other ethylenically unsaturated polymerizable compounds. In other systems, for example, the liquid can be ethylene glycol and the coreactant, e.g., coated on the mold, can be terephthalic acid or a carboxyl terminated polymer thereof, thereby producing a skin of polyethylene terephthalate or similar structure, with an ethylene glycol center. Similarly, glycerol can be used as a liquid and phthalic anhydride as the coreactant to form a glyptal type resin, or ethylene glycol or other glycols such as polyethylene glycol can be used as the liquid and maleic anhydride can be used as the coreactant, e.g., coated on the mold interior as a molt, to form an alkyd resin skin. In this latter system, the skin can further be converted by thermosetting, e.g., by contacting with a peroxidic or other catalytic material. Similarly, ethylene dichloride can be used as a liquid and sodium polysulphide as the coreactant or conversion agent to form a thiokol skin, or a diisocyanate can be used as the liquid and a viscous paste containing polyester can be used as the coreactant.

In still another system, a light permeable mold, e.g., of glass or other translucent material, can be filled with a light or heat convertible liquid substance, and can be irradiated with radiant heat or light to convert the outer portion of the substance. For example, a glass mold interior can be coated with a heat sensitive catalyst such as benzoyl peroxide and a liquid substance comprising polyester, alkyd and/or acrylic or other vinyl resin, e.g. the vinyl plastisol used in the specific example discussed with reference to FIGS. 2 and 3, can be placed in the mold; the mold can then be closed, irradiated with infra-red radiation to set the outer portion of the resin and thereby create the solid skin or shell. Alternatively, the glass mold interior can be coated with a light-sensitive catalyst, e.g., an azo catalyst such as alpha, alpha' azodiisobutyronitrile, the mold can be filled with the plastisol, closed, and irradiated with ultraviolet light until the solid skin forms. Similar systems can be used for solidifying a skin using numerous other radiant energy sources, such as electron generators, gamma and/or beta rays, X-rays, etc., by proper selection of the convertible liquid and catalyst where needed. Suitable resin and/or catalyst components for all such systems are well known to those in the art.

It will be apparent from the foregoing that we have provided a new and useful article and method of manufacturing the same. The article can be manufactured in a one-step molding procedure in which only the outer portion of a liquid mass is caused to react with a coreactant to form a solid shell or skin around the liquid mass. It is an advantage of such a system that it eliminates a number of steps previously considered necessary in the production of liquid center articles of manufacture.

We claim:

1. An article of manufacture comprising a solid plastic skin enclosing a shelf stable liquid central portion, said skin having a set solid molecular structure containing the molecular structure of the molecules of the liquid of said central portion, said liquid being convertible to said set solid molecular structure of said skin and said set solid molecular structure being characterized in that it is derived by conversion of said liquid.

2. The article of claim 1 in which the liquid portion has a freezing point above −50° F. so that it can readily be frozen and wound with a tight rubber strand and covered with a golf ball cover material.

3. The article of claim 1 wherein said liquid central portion at least partially fills the enclosure within said skin.

4. The article of claim 1 wherein said skin is of readily flexible elastic plastic material having sufficient resilience to maintain its form.

5. The article of claim 1 wherein said skin is of a set solid plastic and said liquid is a monomeric precursor of the set solid plastic.

6. The method of making a liquid core article having a solid plastic skin, which method comprises forming the article from a mass of liquid settable material and setting the outer portion only of said mass to a solid plastic whereby a solid plastic skin forms over the exterior portion of the liquid mass leaving the central portion in liquid state.

7. The method of claim 6 wherein said liquid material is a monomeric precursor for the solid plastic.

8. The method of claim 7 wherein said monomer in precursor is thermosetting and said setting step in by heating the mass from the exterior at a sufficiently high temperature to set only the outer portion of said mass.

9. The method of claim 8 wherein said thermosetting material is a plastisol.

10. The method of claim 6 wherein said liquid material is a polymerizable resin and said setting is by contacting the outer portion only of the liquid mass with sufficient catalyst to set said resin and form said skin.

11. The method of claim 6 wherein said liquid material is a cross-linkable polymer and said setting step is by contacting the outer portion only of said mass of liquid material with sufficient cross-linking agent to set the outer portion and form said skin.

12. A method of making a golf ball comprising the method of claim 6 wherein said liquid mass is formed to a spherical shape during the forming step and wherein the sphere resulting from the setting step is then covered by suitable golf ball cover material to bring the sphere up to regulation golf ball size and shape.

13. The method of claim 12 including the steps, after setting, of freezing the resulting sphere and tightly winding the frozen sphere with a stretched elastic strand, and wherein said covering step comprises molding thermosetting cover material about the resulting wound sphere with the sphere still frozen and centered in a mold.

14. The method of claim 6 wherein the mold is radiation permeable and the setting step is by irradiating from a radiation source.

15. The method of claim 14 where the radiation source is heat.

16. The method of claim 14 wherein the radiation source is light.